United States Patent
Susskind et al.

(10) Patent No.: US 11,163,981 B2
(45) Date of Patent: Nov. 2, 2021

(54) PERIOCULAR FACIAL RECOGNITION SWITCHING

(71) Applicant: Apple Inc., Cupertino, CA (US)

(72) Inventors: Joshua M. Susskind, San Jose, CA (US); Walter A. Talbott, Cupertino, CA (US); Shih-Yu Sun, Cupertino, CA (US); Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 16/277,282

(22) Filed: Feb. 15, 2019

(65) Prior Publication Data

US 2020/0082157 A1 Mar. 12, 2020

Related U.S. Application Data

(60) Provisional application No. 62/729,908, filed on Sep. 11, 2018.

(51) Int. Cl.
*G06K 9/00* (2006.01)
*G06K 9/32* (2006.01)

(52) U.S. Cl.
CPC ..... *G06K 9/00281* (2013.01); *G06K 9/00228* (2013.01); *G06K 9/3241* (2013.01)

(58) Field of Classification Search
CPC .......... G06K 9/00281; G06K 9/00228; G06K 9/00275; G06K 9/00597; G06K 9/3241
See application file for complete search history.

(56) References Cited

U.S. PATENT DOCUMENTS

| 8,913,839 | B2 | 12/2014 | Ricanek, Jr. et al. |
| 9,430,697 | B1 | 8/2016 | Iladis et al. |
| 9,600,711 | B2 | 3/2017 | Shreve et al. |
| 9,721,150 | B2 | 8/2017 | Gottemukkula et al. |
| 9,836,643 | B2 | 12/2017 | Saripalle et al. |
| 2015/0110349 | A1* | 4/2015 | Feng ................. G06K 9/00234 382/103 |

(Continued)

FOREIGN PATENT DOCUMENTS

| CN | 107273840 A | 10/2017 |
| DE | 20 2018 000407 | 4/2018 |

OTHER PUBLICATIONS

ESR, EP Application No. 19189665.3-1207, dated Jan. 2, 2020, 12 pages.

(Continued)

*Primary Examiner* — Tom Y Lu
(74) *Attorney, Agent, or Firm* — Kowert, Hood, Munyon, Rankin & Goetzel, P.C.; Gareth M. Sampson

(57) ABSTRACT

A facial recognition authentication process operating on a device may capture an image of a user using a camera on the device. The facial recognition authentication process may include operating a full face facial recognition authentication process on the captured image or operating a partial face facial recognition authentication process on the captured image. The process may determine which process to operate (either full face or partial face) based on an assessment of an amount of occlusion in the captured image. The partial face facial recognition authentication process may be operated when there is at least some occlusion of selected features (e.g., nose and/or mouth) on the user's face in the captured image.

20 Claims, 12 Drawing Sheets

(56) References Cited

U.S. PATENT DOCUMENTS

| | | | |
|---|---|---|---|
| 2017/0206404 A1 | 7/2017 | Saripalle et al. | |
| 2017/0344793 A1 | 11/2017 | Xue et al. | |
| 2018/0081427 A1* | 3/2018 | Siddiqui | G06F 3/013 |
| 2018/0276465 A1* | 9/2018 | Lee | G06K 9/00892 |
| 2018/0285628 A1* | 10/2018 | Son | G06K 9/00302 |
| 2019/0073522 A1* | 3/2019 | Zhao | G06K 9/00281 |
| 2019/0087647 A1* | 3/2019 | Du | G06K 9/00281 |

OTHER PUBLICATIONS

Unsang Park et al: "Periocular biometrics in the visible spectrum: A feasibility study", Biometrics: Theory, Applications, and Systems, 2009. BTAS '09. IEEE 3rd International Conference on, IEEE, Piscataway, NJ, USA, Sep. 28, 2009 (Sep. 28, 2009), pp. 1-6, XP031570302, ISBN: 978-1-4244-5019-0.

Burgos-Artizzu Xavier P et al: "Robust Face Landmark Estimation under Occlusion", Computer Vision (ICCV), 2011 IEEE International Conference on, IEEE,Dec. 1, 2013 (Dec. 1, 2013), pp. 1513-1520, XP032572911, ISSN: 1550-5499, DOI: 10.1109/ICCV. 2013.191 [retrieved on Feb. 28, 2014].

Gayathri Mahalingam et al:"LBP-based periocular recognition on challenging face datasets", EURASIP Journal on Image and Video Processing, vol. 2013, No. 1,Dec. 1, 2013 (Dec. 1, 2013), XP055650571, DE ISSN: 1687-5176, DOI: 10.1186/1687-5281-2013-36.

* cited by examiner

PERIOCULAR FACIAL RECOGNITION SWITCHING

PRIORITY CLAIM

This patent claims priority to U.S. Provisional Patent Application No. 62/729,908 to Susskind et al., entitled "PERIOCULAR FACIAL RECOGNITION SWITCHING", filed Sep. 11, 2018, which is incorporated by reference in their entirety.

BACKGROUND

1. Technical Field

Embodiments described herein relate to methods and systems for face recognition in images captured by a camera on a device. More particularly, embodiments described herein relate to operation of a facial recognition authentication process on images of a user with and without occlusion in the images.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, there are occasionally times where all or some of the user's faces is occluded in the image. For example, the user's face may be occluded by a mask, a scarf, the user's hand, or another object. Typically, a facial recognition process that operates on a user's entire face (e.g., full face facial recognition) is likely to fail in authenticating the user unless security restrictions placed on the process are relaxed (e.g., there are not enough features in the image to authenticate the user unless security restrictions are relaxed to allow matching with fewer matched features). Relaxing the security restrictions may, however, allow increased false acceptance rates (e.g., more matching between authorized users and non-authorized users). Maintaining the higher security restrictions may, however, reduce the usability of the device as the user is more likely to fail the authentication process when any part of the face is occluded and the user may have to retry the facial recognition process more frequently. Operating a facial recognition process while some of the user's face is occluded may increase the usability of the device but may sacrifice security in using the device. Maintaining security levels for full face, non-occlusion images while increasing usability of the device may be useful to provide a more satisfying user experience.

SUMMARY

In certain embodiments, a facial recognition authentication process operating on a device includes a switch between a full face facial recognition authentication process and a partial face facial recognition authentication process. The switch may operate by assessing occlusion in an image captured by a camera on the device in response to a user attempting to access the device. The device may operate the full face facial recognition authentication process when certain facial features of the user (e.g., the eyes, nose, and/or mouth) are not occluded in the image. The device may operate the partial face facial recognition authentication process when these facial features are at least partially occluded.

In some embodiments, the partial face facial recognition authentication process is trained using the same training images as the full face facial recognition authentication process. The training images may be cropped for use in training the partial face facial recognition authentication process. In some embodiments, enrollment templates (e.g., reference templates) are generated for both the full face facial recognition authentication process and the partial face facial recognition authentication process using the same set of enrollment images. The enrollment images may be full face images. The full face images may be cropped to generate reference templates for the partial face facial recognition authentication process while the full face images may be used without cropping to generate reference templates for the full face facial recognition authentication process.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
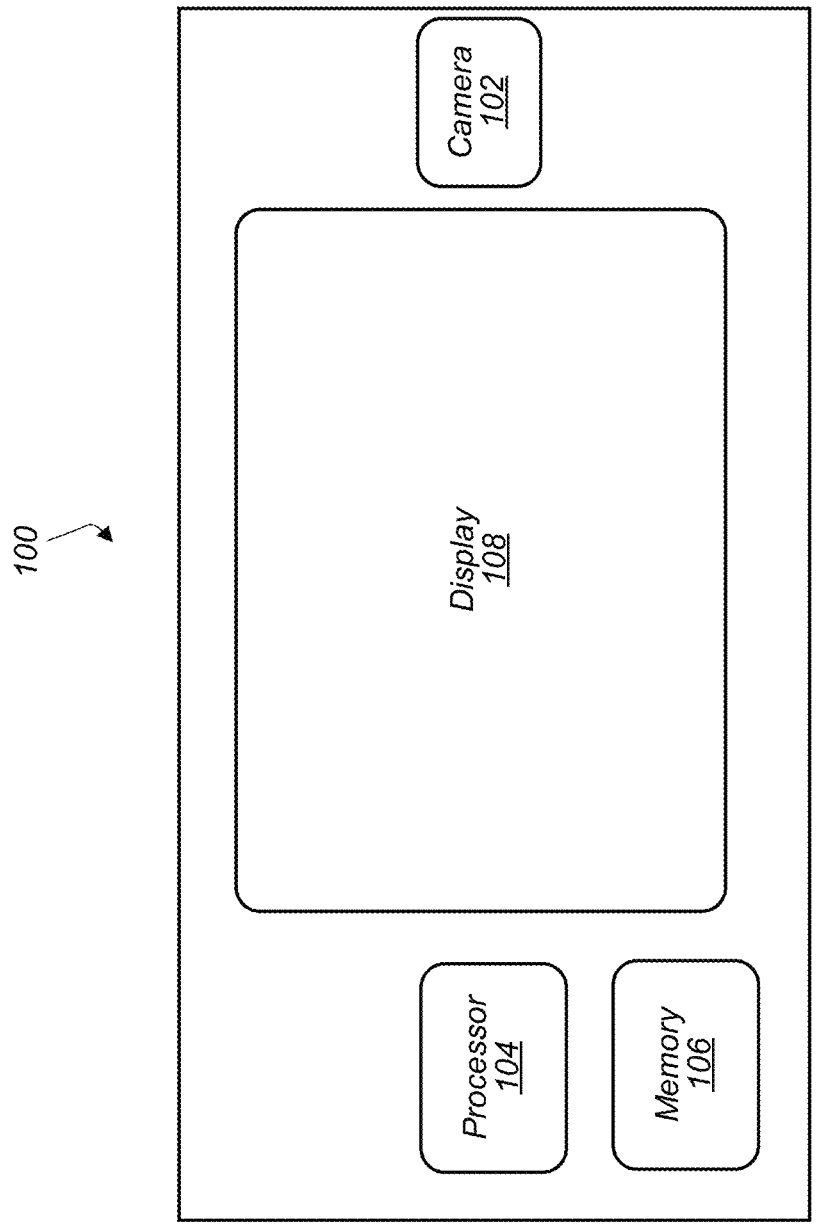
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
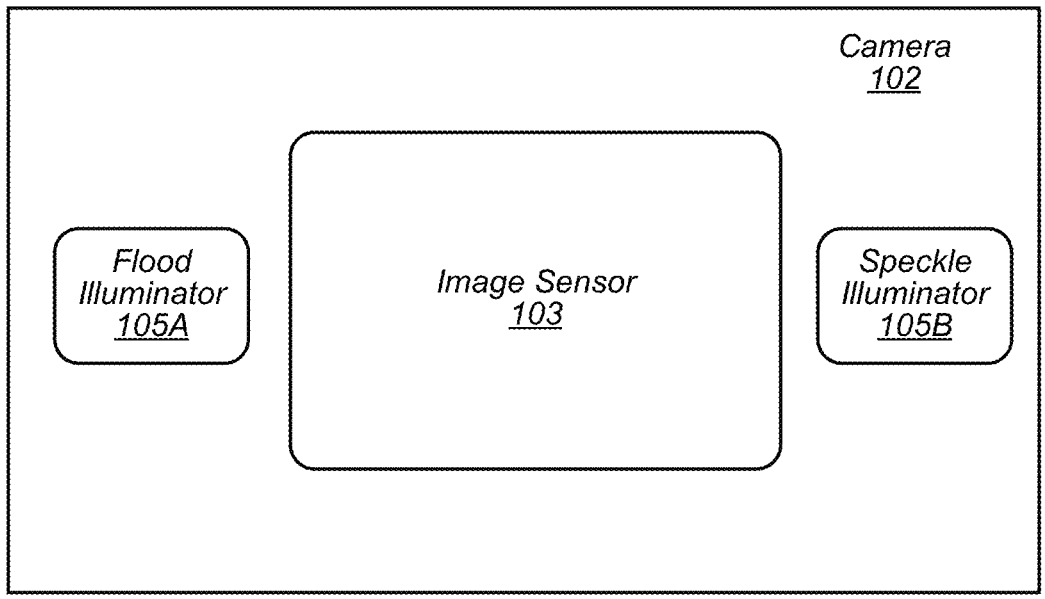
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

For depth detection or generating a depth map image, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
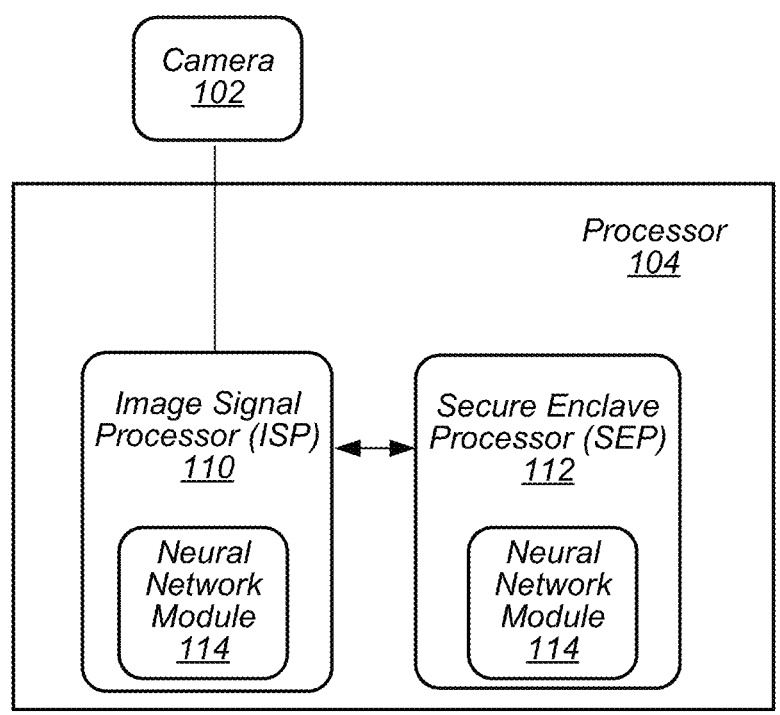
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

Figure 8:
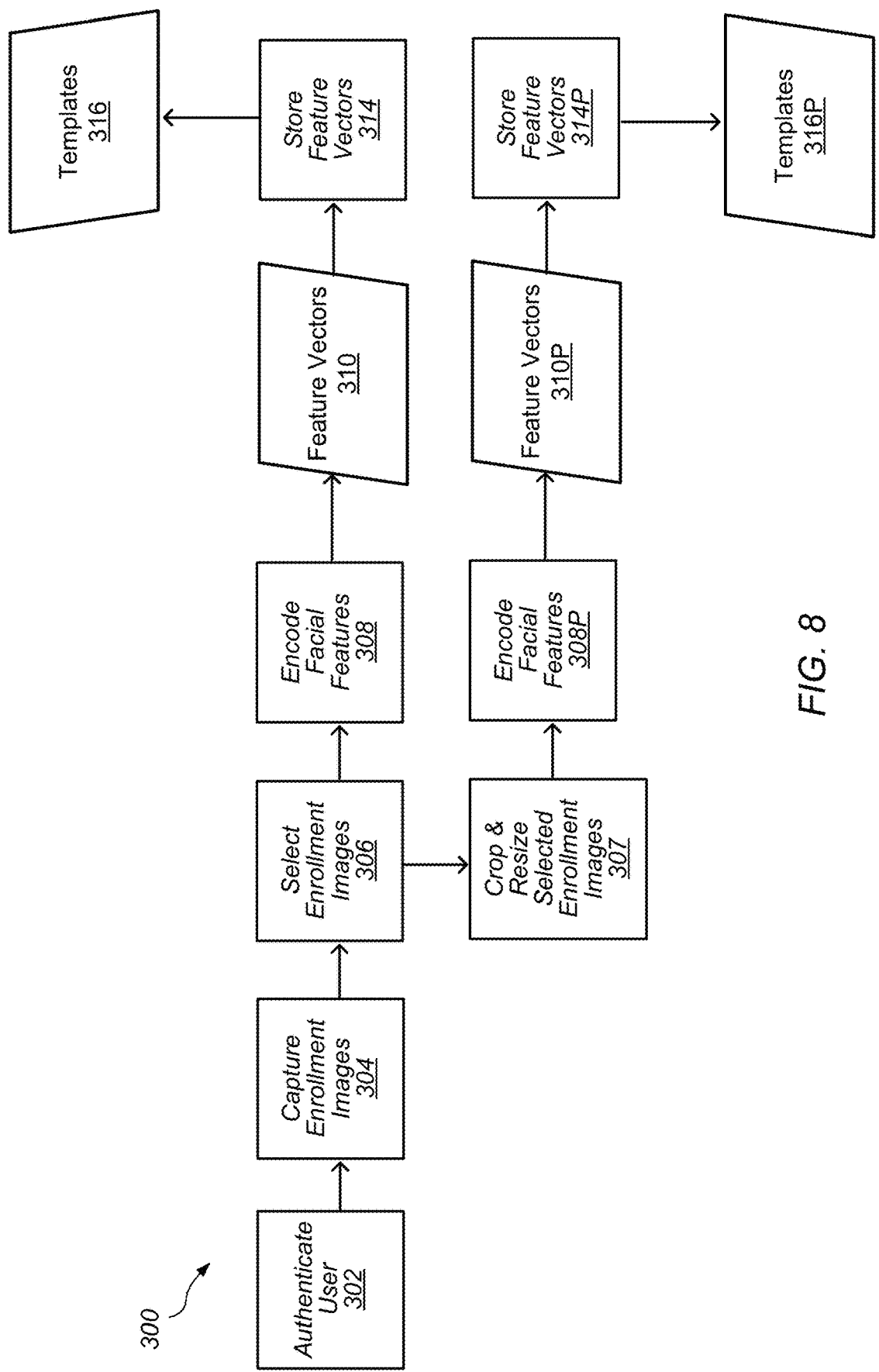
FIG. 8 depicts a flowchart of an embodiment of an image enrollment process for an authorized user of a device.

In certain embodiments, processor 104 performs an enrollment process (e.g., image enrollment process 300, as shown in FIG. 8, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

Figure 4:
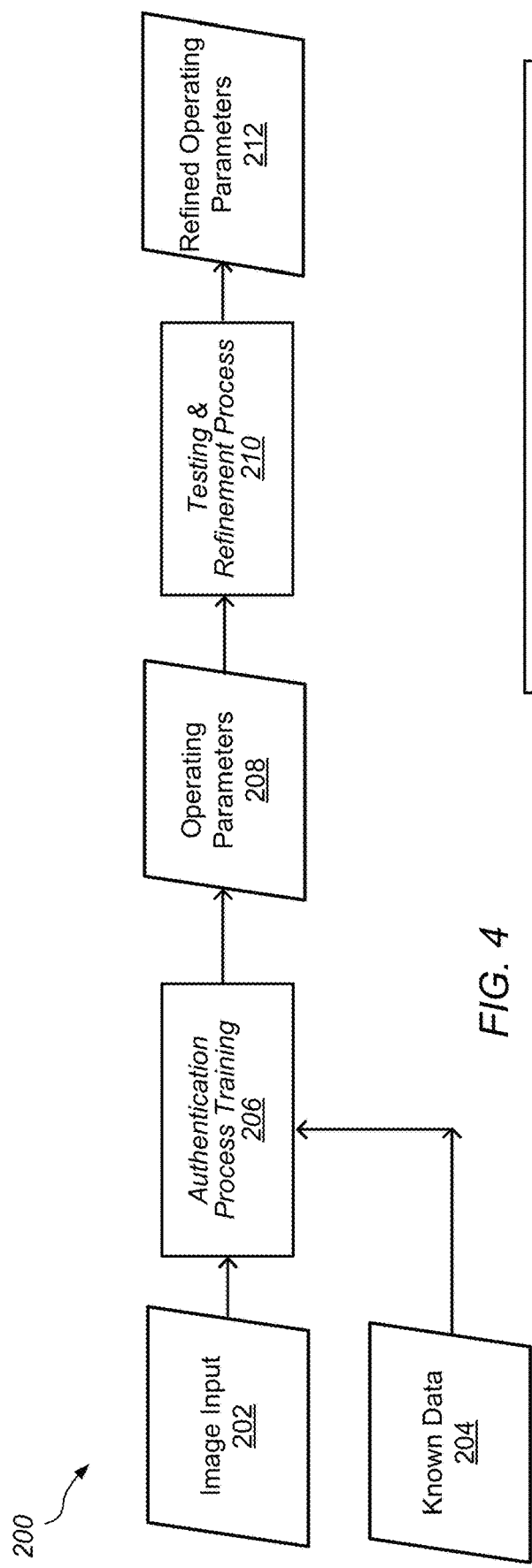
FIG. 4 depicts a flowchart for an embodiment of a training process for a neural network module.
Figure 5:
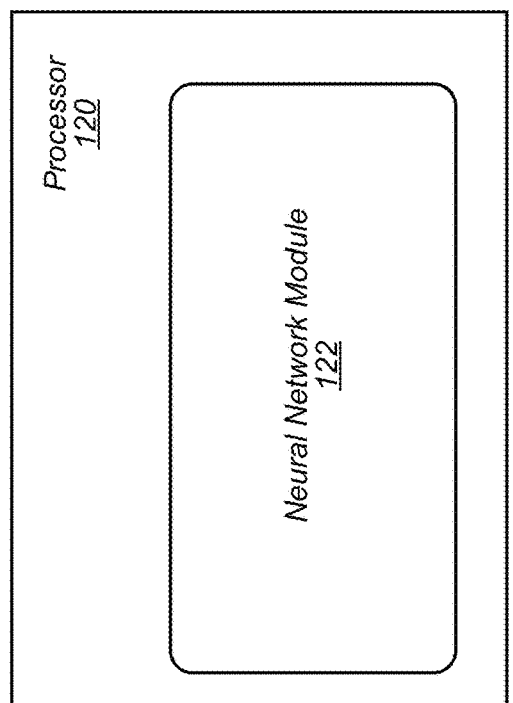
FIG. 5 depicts a representation of an embodiment of a processor with a neural network module.

FIG. 4 depicts a flowchart for an embodiment of training process 200 for a neural network module. In certain embodiments, training process 200 is implemented using a neural network module (e.g., a training neural network module) that is located on a computer processor other than processor 104. FIG. 5 depicts a representation of an embodiment of processor 120 with neural network module 122 that may be used for training (e.g., the training neural network module). Neural network module 122 may include, for example, one or more encoder modules and/or decoder modules. In certain embodiments, images that have been previously captured are provided to neural network module 122 as training images. Known properties of the training images may be provided to neural network module 122 along with the training images (e.g., the training images may be augmented with the known properties). Neural network module 122 may be located on processor 120 to be trained by training process 200. Operating parameters output generated from "trained" neural network module 122 may then be used in neural network module 114 on device 100 for implementation of the "trained" neural network module on the device.

In certain embodiments, as shown in FIG. 4, training process 200 begins with providing image input 202. Image input 202 may include training images provided to training process 200 (e.g., training images augmented or annotated (e.g., labelled) with the known information as described above are provided to the training process). In some embodiments, image input 202 includes training images captured with camera 102 or otherwise provided to training process 200 (e.g., digitally provided to the training process). Training images may include reference images or other sample images obtained from a database of images. For example, training images may be obtained from ImageNet or another similar image database. In certain embodiments, training process 200 is implemented on flood IR illumination images to train the neural network module for face detection in such images. In some embodiments, training process 200 is implemented on patterned illumination images (e.g., images used to generate depth map images) to train the neural network module for face detection in such images.

Image input 202 may include a plurality of training images with a variety of different users and/or faces in the images. In some embodiments, the images have labels or other indicia identifying known information for the images. The known information may be provided into training process 200 as known data 204. In some embodiments, the training images are augmented with known data 204.

In certain embodiments, image input 202 is provided to authentication process training 206. Authentication process training 206 may include training the neural network module to operate a facial recognition authentication process (e.g., full face facial recognition authentication process 450 described in FIG. 16 and/or partial face facial recognition authentication process 450P described in FIG. 17) to authenticate the user in image input 202. In some embodiments, authentication process training 206 includes the neural network module assessing differences between processing of the images (e.g., encoding and/or decoding of feature vectors for image input 202) and known data 204 for the image input and refining the process until the neural network module accurately authenticates users in the image input. Thus, as multiple training images are processed in training process 200, authentication process training 206 (and the neural network module) may be trained by the training images in image input 202 and known data 204 to accurately match or authenticate user's in the training images.

Training process 200 may include training authentication process training 206 (and the neural network module) on a plurality of training images with a variety of different users and/or faces in the images along with varying properties and/or situations of the faces in the images. After training process 200 is completed on a set of training images, operating parameters 208 may be generated by authentication process training 206. Operating parameters 208 include parameters useable in neural network module 122, shown in FIG. 5, to authenticate a user's face(s) input into the neural network module as being an identifiable face (e.g., provide authentication that the user in the image is a known or authorized user).

Figure 6:
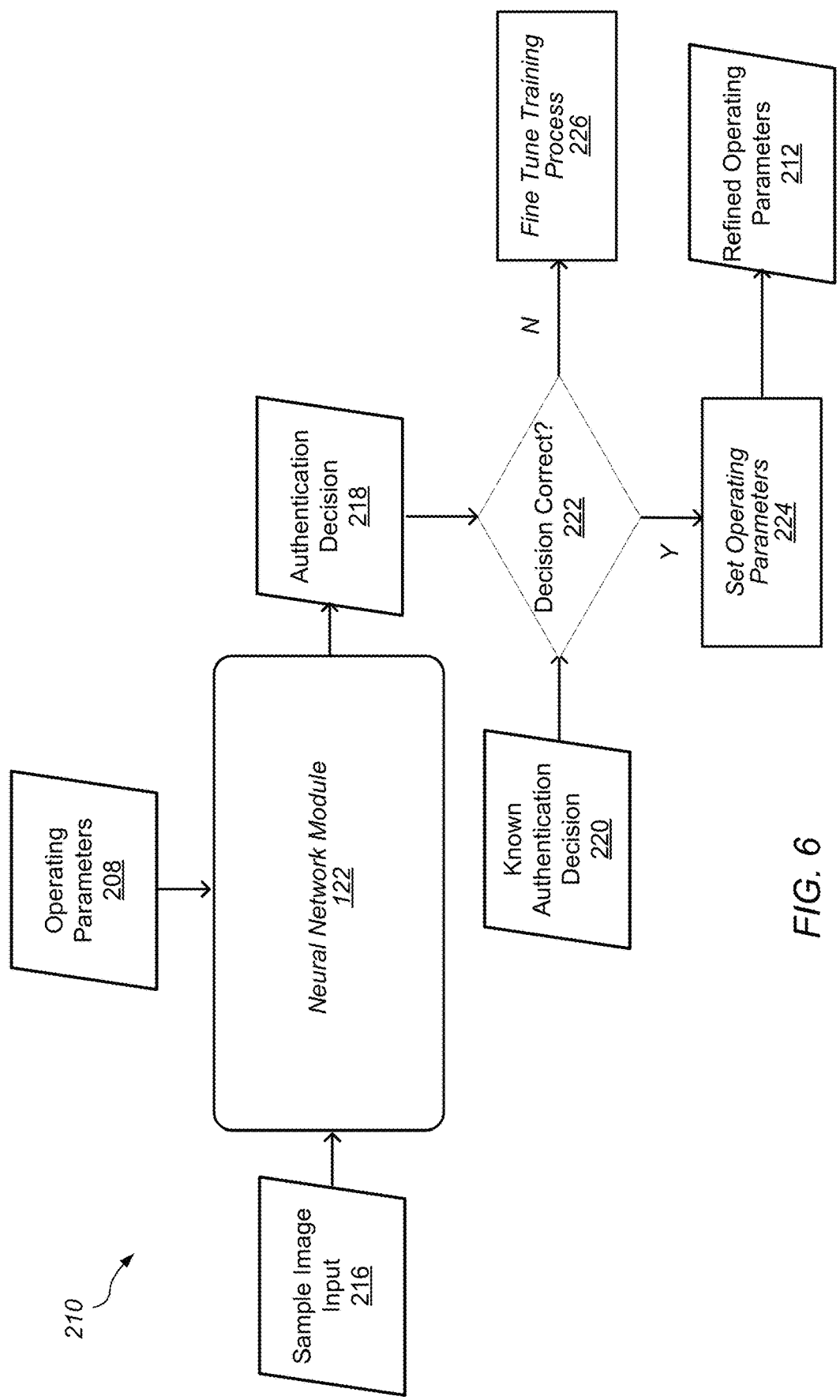
FIG. 6 depicts a flowchart for an embodiment of a testing and refinement process.

In some embodiments, operating parameters 208 may be tested and refined in 210 to provide refined operating parameters 212. Testing and refinement process 210 may include inputting the operating parameters into neural network module 122 and operating the module on a sample image with known information (e.g., known identity). FIG. 6 depicts a flowchart for an embodiment of testing and refinement process 210. In process 210, sample image input 216 may be provided to neural network module 122 along with operating parameters 208. Neural network module 122 may determine authentication decision 218 by processing sample input image 216 using operating parameters 208. Authentication decision 218 (and any data associated with the decision) may be compared to known authentication decision 220 (e.g., whether user in sample image input 216 should be authenticated) to see if the decision is correct in 222.

If authentication decision 218 matches known authentication decision 220, then the operating parameters are set in 224 and refined operating parameters 212 are provided as output (e.g., the refined operating parameters may be set and used to program neural network module 114 on processor 104, shown in FIG. 3, for use in a facial recognition authentication process described herein). If authentication decision 218 does not match known authentication decision 220, then the training process (e.g., training process 200, shown in FIG. 4) may be fine-tuned in 226. Fine-tuning the training process may include providing additional training images to training process 200 and/or other adjustments in the training process to refine the operating parameters (or generate new operating parameters) for neural network module 122. Once refined operating parameters 212 for neural network module 122 are set in 224, the operating parameters may be applied to device 100, shown in FIG. 1, by providing the operating parameters to neural network module 114 on the device.

In certain embodiments, training images are provided to training process 200 with the entire faces (e.g., full faces) of the users within the frames of the images presented to the training process (e.g., a full face of a user is within the frame of an image processed by the training process). Providing full faces in the training images trains authentication process training 206 (and the neural network module) to authenticate a user based on the user's entire (full) face. For example, matching (authentication) of the user's face is determined based on features over the entirety of the user's face. Operating parameters generated for training based on full face images may be used in a neural network module to operate a full face facial recognition authentication process (e.g., full face facial recognition authentication process 450, described in FIG. 16).

In certain embodiments, authentication process training 206 (and the neural network module) is trained to authenticate a user based on a portion of the user's face. For example, authentication process training 206 (and the neural network module) may be trained to authenticate a user based on a periocular portion of the user's face. As used herein, the term "periocular portion" is a portion of a face that includes a periocular region of the face. The periocular region may be a region of the face surrounding the eyes that includes the eyeballs, the orbits, and the corners of the eyes. The periocular portion, while including the periocular region (e.g., the eyeballs and orbits of the eyes), is, however, not limited to the periocular region and may include portions of the face surrounding the periocular region. For example, a periocular portion may include portions of the nose (e.g., the bridge and/or tip of the nose) and/or portions of the forehead in addition to the periocular region. In some embodiments, a periocular portion may include the top of the head of the face in addition to the periocular region.

Authentication process training 206 may also, in some embodiments, be trained to authenticate a user based on other portions of the user's face. In certain embodiments, training images with full faces of users (e.g., training images used to train the neural network module for full face facial recognition authentication process, as described above) are also used to train a neural network module for a partial face facial recognition authentication process. For use in partial face training, the training images with the full faces of users may be cropped or reduced to be used for partial face training. Operating parameters generated for training based on partial face images may be used in a neural network module to operate a partial face facial recognition authentication process (e.g., partial face facial recognition authentication process 450P described in FIG. 17).

Using the same training images for both full face training and partial face training may reduce the amount of data need to train both neural network modules (both full face and partial face neural network modules). Cropping the full face training images to be used in the partial face training may allow partial face training of the neural network module to be accomplished without acquiring a full set of images with user's faces blocked or occluded in the images (e.g., images with the user's face blocked or occluded by masks, scarves, etc.).

Figure 7:
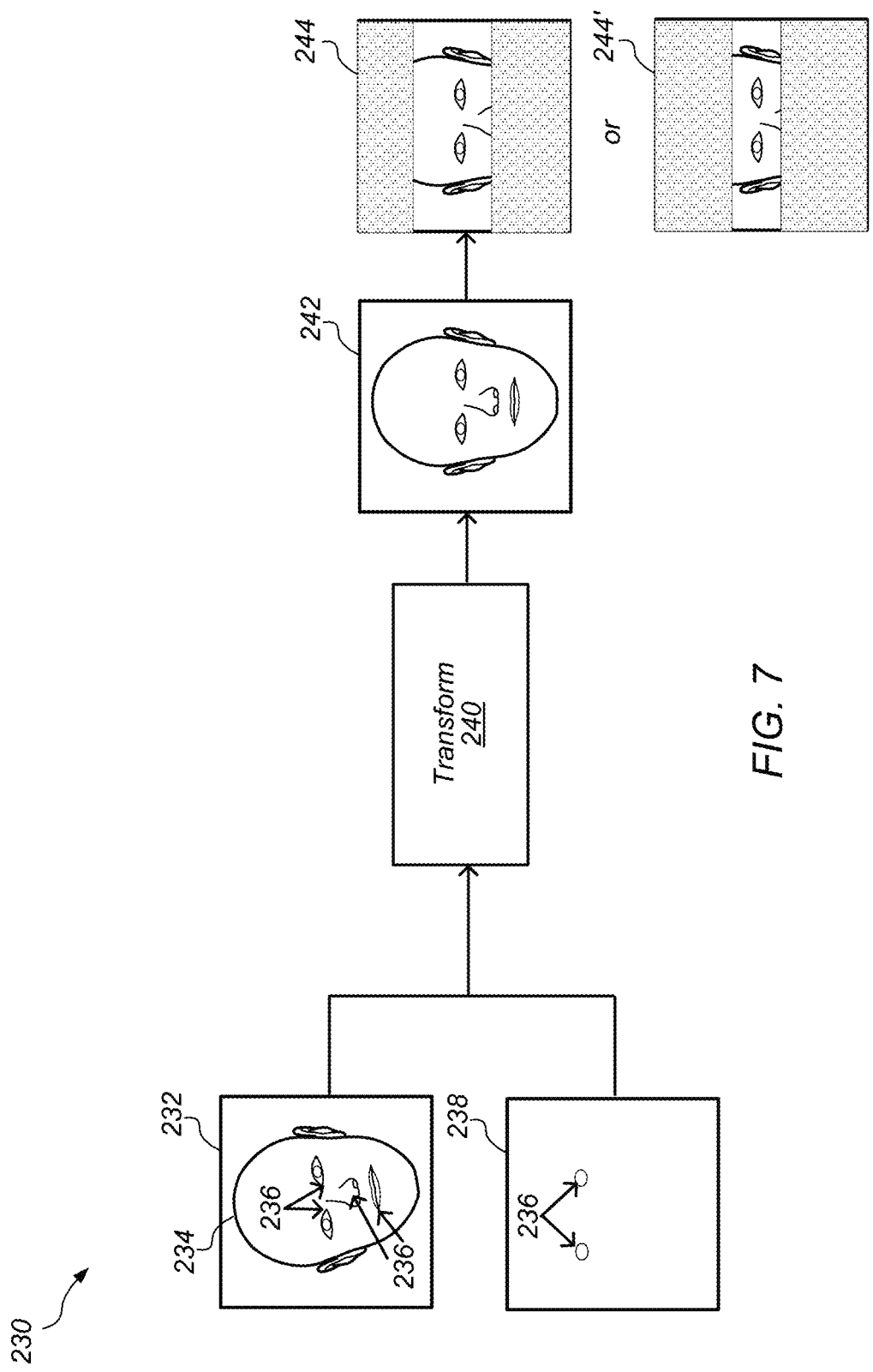
FIG. 7 depicts a representation of an embodiment of a process for cropping full face training images for use in a partial face training process.

FIG. 7 depicts a representation of an embodiment of process 230. Process 230 may be used to crop full face training images for use in a partial face training process. For example, process 230 may crop images used in process 200 to train authentication process training 206 (and the neural network module) to operate on partial faces. In certain embodiments, process 230 crops the training images to periocular portions of the user's faces in the images (e.g., portions of the face including the eyes). The images may, however, be cropped to include other portions of the user's face as desired (e.g., based on desired output of training for process 200).

As shown in FIG. 7, training image 232 includes face 234 of the user. Face 234 may include a full face of the user. In certain embodiments, landmarks 236 are identified on face 234. For example, another neural network module, other network circuitry, and/or another process may be used to identify and locate landmarks 236 on face 234. Landmarks 236 may include, but not be limited to, corners of eyes, bridge or tip of nose, corners of mouth. For embodiments cropping the periocular portion (or another portion including the eyes) of face 234, landmarks 236 for the eyes may be used to align and identify the face in the image as the eyes may be the only landmarks visible (e.g., when the nose and/or mouth are blocked or occluded, only the eyes are visible in the image).

In certain embodiments, image 232 is aligned to a normal alignment (e.g., face is rotated to a normal portrait position (where the face is vertically aligned in the frame) such as depicted by aligned image 242 in FIG. 7) using landmarks 236 for the eyes. A normal alignment of eye landmarks is shown in aligned image configuration 238. Aligning (rotating) training images to the normal alignment may provide more accurate eye locations in the training process and rectify roll angles from the training images. Training on images with normal alignment may provide a more robust training process and improve matching (authentication) for the training process (and the later programmed partial face facial recognition authentication process). Rotating image 232 to the normal alignment may also allow more training images to be used as not all training images are in normal alignment (thus rotation of images allows more training images to be used).

As shown in FIG. 7, training image 232 with identified eye landmarks 236 may be provided, along with aligned image configuration 238, to transform 240. Transform 240 may align image 232 according to eye landmarks 236 to produce aligned image 242. Transform 240 may be, for example, an image warp with a similarity transform to preserve the shape of face 234 in aligned image 242.

After aligned image 242 is obtained, the aligned image may be cropped using eye landmarks 236 to determine the location of the crop. Cropping of aligned image 242 may generate cropped image 244. Cropped image 244 may be, for example, an image cropped to a periocular portion of the user's face (e.g., the image is cropped to a portion of the user's face that includes the periocular region of the face). In some embodiments, cropped image 244 includes the forehead of the face, as shown in FIG. 7. The cropped image may, however, include cropping of the forehead from the image as shown by alternative cropped image 244', also shown in FIG. 7. Alternative cropped image 244' may be an image cropped from the top and the bottom to a narrow area that includes the user's eyes (e.g., the narrow area includes the periocular region of the face).

After cropped image 244 is generated by process 230, the cropped image may be provided to training process 200, shown in FIG. 4. In certain embodiments, cropped image 244 is resized when provided to training process 200. Resizing cropped image 244 may allow training process 200 (and later operations on device 100) to operate on a larger image (and the amount of information contained in a larger image) even when only a portion of the face is in the image. The larger image may be, for example, a full-sized image or another image size determined by resolution and/or computational constraints. Using cropped images 244 in training process 200 may generate operating parameters 212 that may be used to operate a partial face facial recognition authentication process on device 100 (e.g., partial face facial recognition authentication process 450P described in FIG. 17). In certain embodiments, the neural network module trained for the partial face facial recognition authentication process is a separate neural network module from the neural network module trained for the full face facial recognition authentication process.

Figure 16:
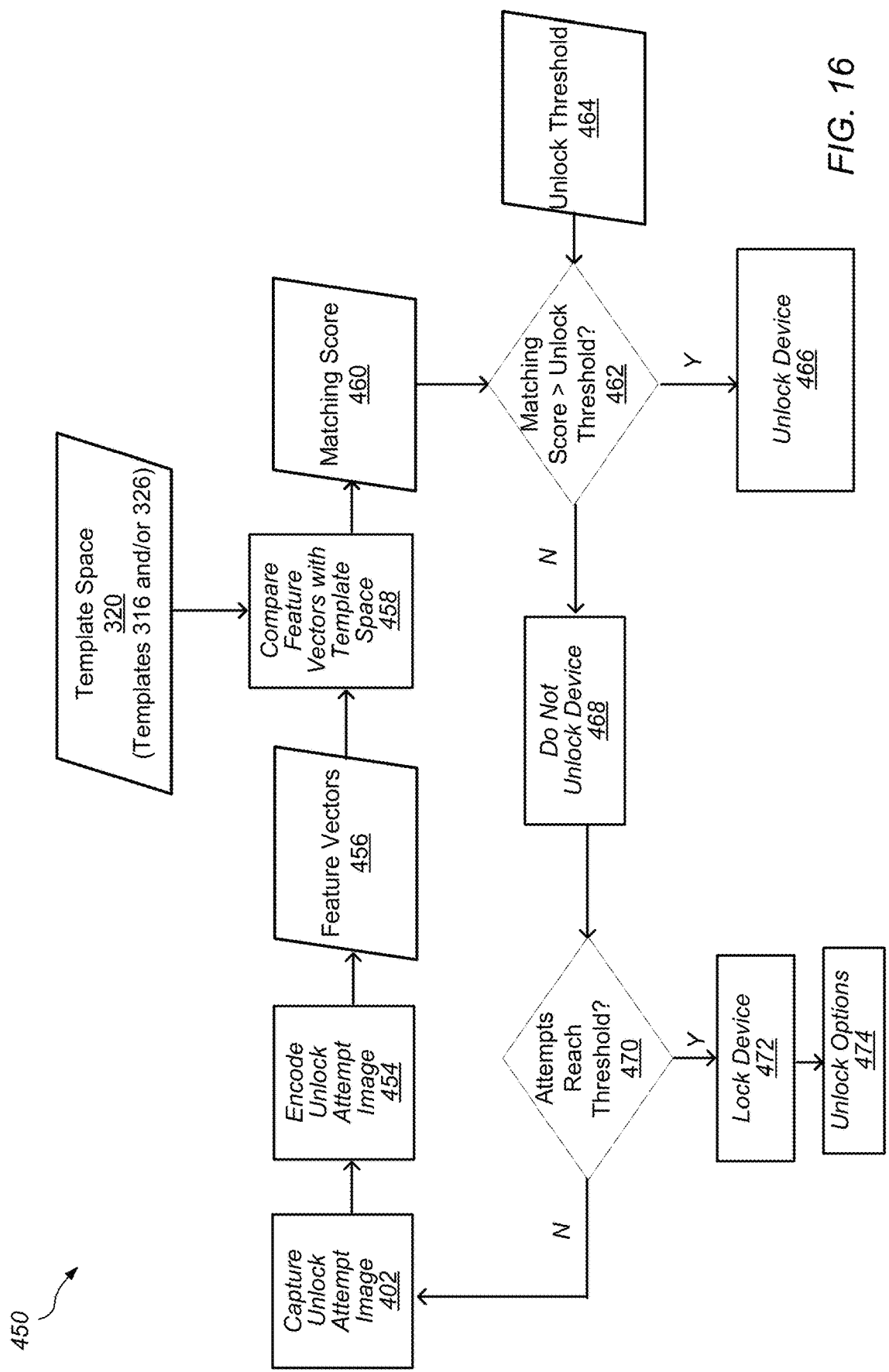
FIG. 16 depicts a flowchart of an embodiment of a full face facial recognition authentication process.
Figure 17:
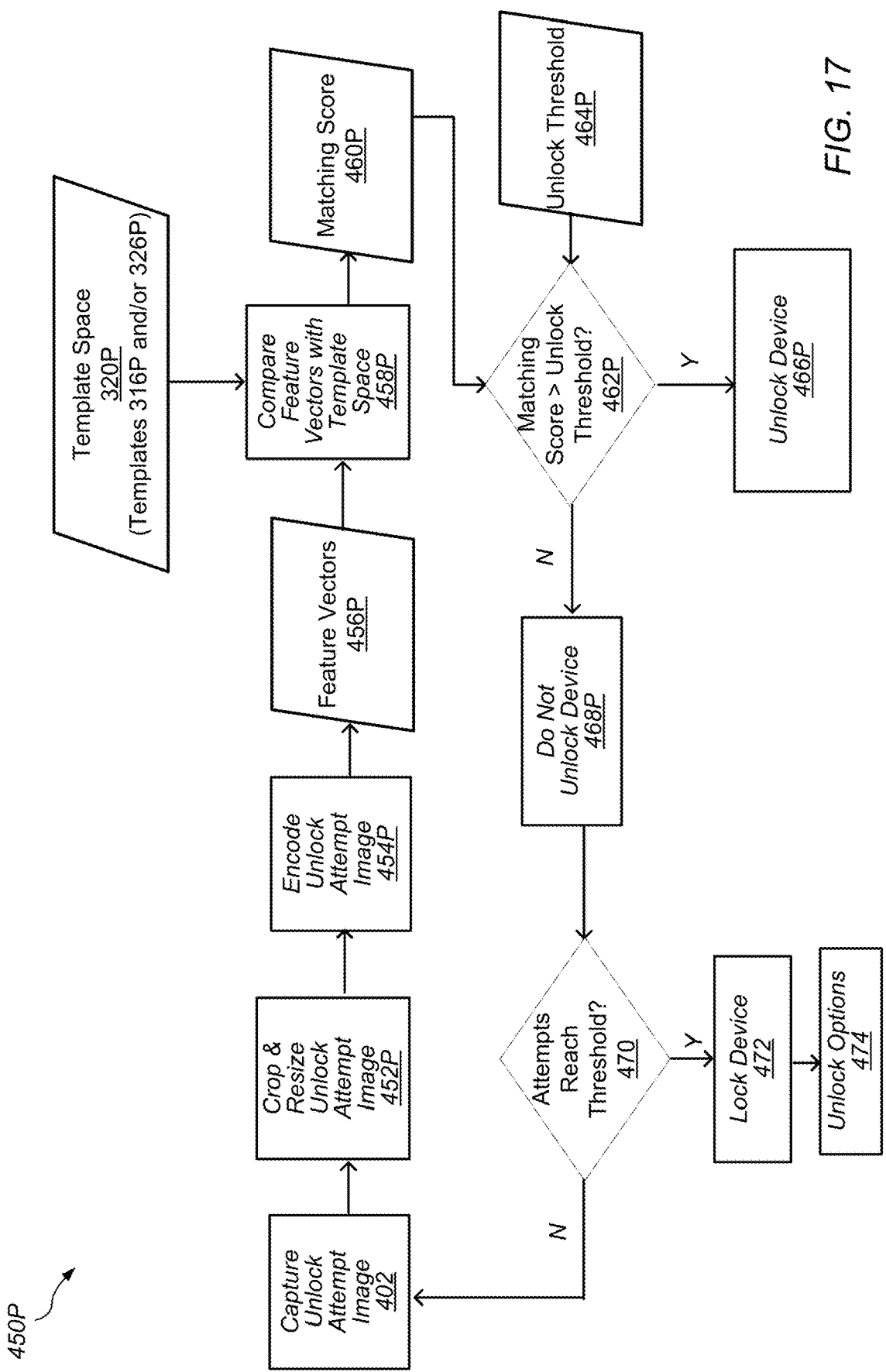
FIG. 17 depicts a flowchart of an embodiment of a partial face facial recognition authentication process.

In certain embodiments, a first set of refined operating parameters 212 are applied to device 100, shown in FIG. 1, for the full face facial recognition authentication process (e.g., full face facial recognition authentication process 450, described in FIG. 16) and a second set of refined operating parameters 212 are applied to the device for the partial face facial recognition authentication process on device 100 (e.g., partial face facial recognition authentication process 450P described in FIG. 17). The first and second set of operating parameters 212 may be applied to and operated on by separate neural network modules on device 100. Thus, device 100 may operate two separate facial recognition authentication processes on two separate neural network modules. Each of the neural network modules may operate using operating parameters determined specifically for that neural network module so that each neural network module may operate independently.

In some embodiments, some training images may be excluded from being used in training for the partial face facial recognition authentication process to improve false rejection rates for the partial face process. For example, training images may be excluded when any occlusion on the eyes are in the images and/or when there is full occlusion of the eyebrows in the images. In some embodiments, training images with no occlusion on the nose may be defined as full face images (e.g., images handled by the full face facial recognition authentication process) as such images may be better handled by the full face process.

In certain embodiments, stronger restrictions are placed on the partial face facial recognition authentication process than are placed on the full face facial recognition authentication process. Less feature data may be available for partial face images than full face images. Thus, stronger restrictions may be placed on the partial face facial recognition authentication process in order to maintain security levels on the partial face process that are similar to security levels for the full face facial recognition authentication process.

FIG. 8 depicts a flowchart of an embodiment of image enrollment process 300 for an authorized user of device 100. Process 300 may be used to create an enrollment profile for an authorized user of device 100 that is stored in the device (e.g., in a memory coupled to SEP 112). The enrollment profile may include one or more templates for the authorized user created using process 300. In some embodiments, process 300 is used to create two templates for the authorized user. A first template may be a full face template (e.g., a template used with the full face facial recognition authentication process) and the second template may be a partial face template (e.g., a template used with the partial face facial recognition authentication process). The enrollment profile and the templates associated with the enrollment profile may be used in a facial recognition authentication process to allow (e.g., authorize) the user to use the device and/or perform operations on the device (e.g., unlock the device).

In certain embodiments, process 300 is used when device 100 is used a first time by the authorized user and/or when the user opts to create an enrollment profile for a facial recognition process. For example, process 300 may be initiated when device 100 is first obtained by the authorized user (e.g., purchased by the authorized user) and turned on for the first time by the authorized user. In some embodiments, process 300 may be initiated by the authorized user when the user desires to enroll in a facial recognition process, update security settings for device 100, re-enroll, and/or add an enrollment profile on the device.

In certain embodiments, process 300 begins with authenticating the user in 302. In 302, the user may be authenticated on device 100 using a non-facial authentication process. For example, the user may be authenticated as an authorized user by entering a passcode, entering a password, or using another user authentication protocol other than facial recognition. After the user is authenticated in 302, one or more enrollment (e.g., reference or registration) images of the user are captured in 304. The enrollment images may include images of the user illuminated by flood illuminator 105A (e.g., flood IR images) and/or images of the user illuminated by illuminator 105B (e.g., patterned illumination images used to generate depth map images). As described herein, flood IR images and patterned illumination images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 304, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 304, selection of enrollment images for further image processing may be made in 306. Selection of enrollment images 306, and further processing of the images, may be performed by ISP 110 and/or SEP 112. Selection of enrollment images for further processing may include selecting images that are suitable for generating templates. For example, the selection of images that are suitable for use generating templates in 306 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned too far in any direction from the camera (i.e., the pitch, yaw, and/or roll of the face are not above certain levels), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 306, for full face images (e.g., images with the entire user's face in the images), features of the user in the selected (template) images may be encoded in 308. Encoding of the selected images may include encoding features (e.g., facial features) of the user to define the features in the images as one or more feature vectors in a feature space. Feature vectors 310 may be the output of the encoding in 308. A feature space may be an n-dimensional feature space. A feature vector may be an n-dimensional vector of numerical values that define features from the image in the feature space (e.g., the feature vector may be a vector of numerical values that define facial features of the user in the image).

Figure 9:
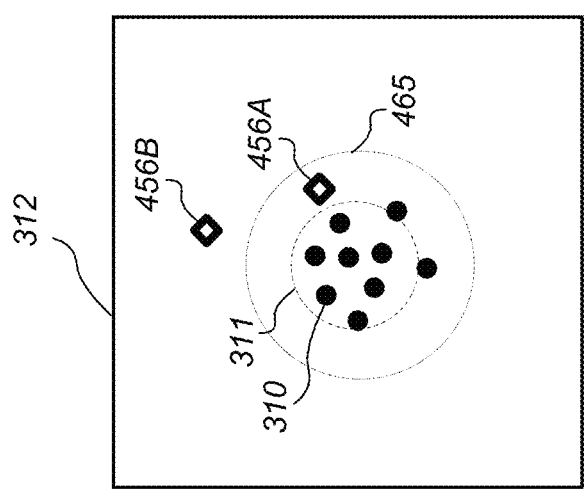
FIG. 9 depicts a representation of an embodiment of a feature space with feature vectors after an enrollment process.

FIG. 9 depicts a representation of an embodiment of feature space 312 with feature vectors 310. Each feature vector 310 (black dot) may define facial features for the user from either a single image, from a composite image (e.g., an image that is a composite of several images), or from multiple images. As feature vectors 310 are generated from a single user's facial features, the feature vectors may be similar to one another because the feature vectors are associated with the same person and may have some "clustering", as shown by circle 311 in FIG. 9. Feature vectors 356A and 356B (open diamonds) are feature vectors obtained from facial recognition process 450, described below.

As shown in FIG. 8, process 300 may include, in 314, storing feature vectors 410 in a memory of device 100 (e.g., a memory protected by SEP 112). In certain embodiments, feature vectors 310 are stored as static templates 316 (e.g., enrollment templates or reference templates) in a template space of the memory (e.g., template space 320 described below). Static templates 316 may be used for the enrollment profile created by process 300. In some embodiments, static templates 316 (and other templates described herein) include separate templates for feature vectors obtained from the enrollment flood IR images and for feature vectors obtained from the enrollment patterned illumination images. It is to be understood that the separate templates obtained from flood IR images and patterned illumination images may be used independently and/or in combination during additional processes described herein. For simplicity in this disclosure, static templates 316 are described generically and it should be understood that static templates 316 (and the use of the templates) may refer to either templates obtained from flood IR images or templates obtained from patterned illumination images. In some embodiments, a combination of the flood IR images and patterned illumination images may be used to generate templates. For example, pairs of feature vectors obtained from flood IR images and patterned illumination images may be stored in static templates 316 to be used in one or more facial recognition processes on device 100.

In certain embodiments, templates 316 (and its associated template space 320) are full face templates for the enrollment profile (e.g., templates generated from full face images of the user associated with the enrollment profile). As shown in FIG. 8, templates may also be generated from partial face images of the user associated with the enrollment profile (e.g., partial face templates 316P). In certain embodiments, partial face templates are generated using the same images used to generate the full face templates. Using the same images for both partial face templates and full face templates may provide more consistent templates for the user and reduce enrollment time for the user (e.g., less time on images being captured).

To generate partial face templates, as shown in FIG. 8, after enrollment images are selected in 306, the selected enrollment images may be cropped to a portion of the user's face and resized in 307. Cropping and resizing of the images may be accomplished using a process similar to process 230, described in FIG. 7. In certain embodiments, the images are cropped to include the periocular portion of the user's face in the images. The images may, however, be cropped to include other portions of the user's face as desired (e.g., based on portions cropped during training process 200). The images may also be aligned (e.g., using landmarks for the eyes) and rotated to place the images in a normal (e.g., portrait) alignment.

After the images are cropped and resized in 307, the images may be encoded in 308P. Encoding of the selected images in 308P may include encoding features to define the features in the images as one or more feature vectors 310P. As the images have been cropped to the particular portion of the user's face, feature vectors 310P may include feature vectors associated with the cropped portion of the user's face (e.g., the periocular portion of the user's face) and not include feature vectors to uncropped portions of the user's face (e.g., forehead, chin, and/or mouth if cropped to periocular portion).

After feature vectors 310P are generated, the feature vectors may be stored, in 314P, in the memory of device 100 (e.g., the memory protected by SEP 112). In certain embodiments, feature vectors 310P are stored in the same portion of memory as feature vectors 310. In some embodiments, feature vectors 310P are stored in a different portion of the memory from feature vectors 310. Feature vectors 310P may be stored as static templates 316P. Static templates 316P may be enrollment templates or reference templates in the template space of the memory (e.g., template space 320 described below). Static templates 316P may be partial face templates that are used for the enrollment profile created by process 300 in addition to full face static templates 316.

Figure 10:
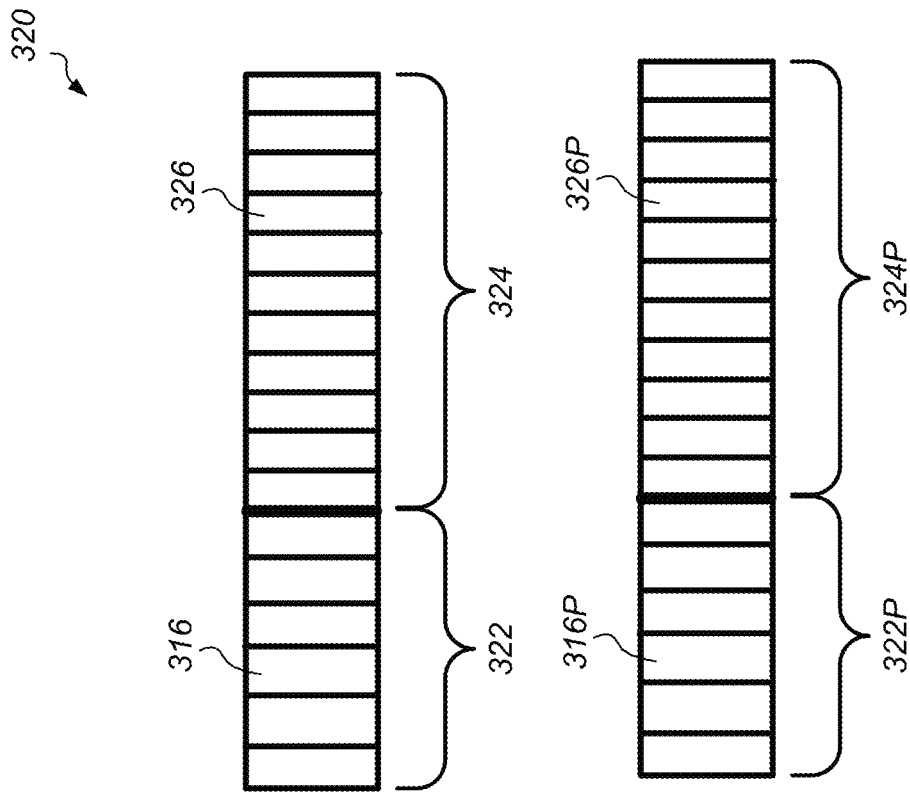
FIG. 10 depicts a representation of an embodiment of a template space for an enrollment profile in a memory of a device.

FIG. 10 depicts a representation of an embodiment of template space 320 for an enrollment profile in memory 106 of device 100. In certain embodiments, template space 320 is located in a portion of memory 106 of device 100 protected by SEP 112. In some embodiments, template space 320 includes static portion 322 and dynamic portion 324 for full face templates and static portion 322P and dynamic portion 324P for partial face templates. Static templates 316 and 316P may be, for example, added to static portion 322 and 322P, respectively of template space 320 (e.g., the templates are permanently added to the memory and are not deleted or changed unless the device is reset). In some embodiments, static portion 322 and/or static portion 322P include a certain number of static templates 316 and/or static templates 316P. For example, for the embodiment of template space 320 depicted in FIG. 10, six static templates 316 (and/or 316P) are allowed in static portion 322 (and/or 322P). In some embodiments, nine static templates 316 (and/or 316P) may be allowed in static portion 322 (and/or 322P). Other numbers of static templates 316 (and/or 316P) in static portion 322 (and/or 322P) may also be contemplated. After the enrollment process for the enrollment profile is completed and static templates 316 and static templates 316P are added to static portion 322 and static portion 322P, respectively, additional dynamic templates 326 and/or dynamic templates 326P may be added to dynamic portion 324 and/or dynamic portion 324P of template space 320 for the enrollment profile (e.g., a portion from which templates may be added and deleted without a device reset being needed).

Static templates 316 and static templates 316P may thus be enrollment templates (or reference templates) generated by enrollment process 300 for the enrollment profile associated with the enrollment process. After enrollment process 300 is completed, a selected number of static templates 316 and static templates 316P are stored in static portion 322 and static portion 322P of template space 320 for the enrollment profile. The number of static templates 316 stored in static portion 322 and the number of static templates 316P stored in static portion 322P after enrollment process 300 may vary depending on, for example, the number of different feature vectors obtained during the enrollment process, which may be based on the number of images selected to be suitable for use as template images, or a desired number of templates for the device. After enrollment process 300, static templates 316 include feature vectors 310 (e.g., the enrollment or reference feature vectors) that can be used for full face facial recognition of the authorized user associated with the enrollment profile. Additionally, after enrollment process 300, static templates 316P include feature vectors 310P (e.g., the enrollment or reference feature vectors) that can be used for partial face facial recognition of the authorized user associated with the enrollment profile. Thus, template space 320 may be used in a full facial recognition authentication process and/or a partial facial recognition authentication process to authorize the user associated with the enrollment profile.

Figure 11:
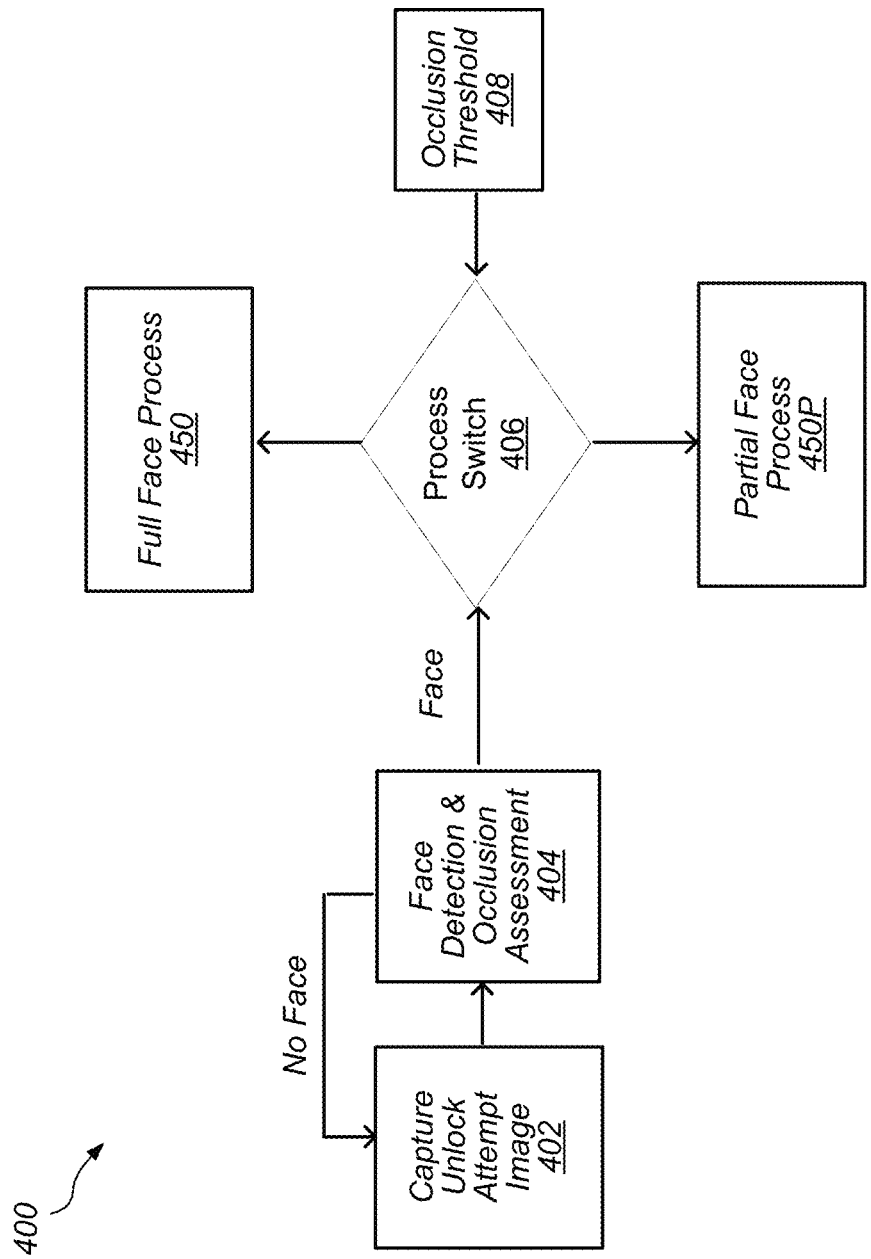
FIG. 11 depicts a flowchart of an embodiment of a facial recognition authentication process.

FIG. 11 depicts a flowchart of an embodiment of facial recognition authentication process 400. Process 400 may be used to authenticate a user as an authorized user of device 100 using facial recognition of the user. In certain embodiments, process 400 is used to authenticate a user using an enrollment profile (e.g., template space 320) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 400 is used as a primary biometric authentication process for device 100 (after enrollment of the authorized user). In some embodiments, process 400 is used as an authentication process in addition to additional authentication processes (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 400.

In 402, camera 102 captures an image of the face of the user attempting to be authenticated for access to device 100 (e.g., the camera captures an "unlock attempt" image of the user). It is to be understood that the unlock attempt image may be a single image of the face of the user (e.g., a single flood IR image or a single patterned illumination image) or the unlock attempt image may be a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, the unlock attempt image may be a composite of several images of the user illuminated by the flood illuminator and the pattern illuminator.

Camera 102 may capture the unlock attempt image in response to a prompt by the user. For example, the unlock attempt image may be captured when the user attempts to access device 100 by pressing a button (e.g., a home button or virtual button) on device 100, by moving the device into a selected position relative to the user's face (e.g., the user moves the device such that the camera is pointed at the user's face or lifting the device from a table), and/or by making a specific gesture or movement with respect to the device (e.g., tapping on the screen, swiping the user's finger across the display, or picking the device off the table). It is to be understood that, as described herein, unlock attempt images may include either flood IR images or patterned illumination images, or a combination thereof. Further, the unlock attempt images may be processed in association with their corresponding template (e.g., flood IR images with a template for flood IR enrollment images) independently or in combination as needed.

In 404, a face detection process may be used to determine and locate one or more faces in the image. If no face is detected in an unlock attempt image, the unlock attempt image may be discarded and additional unlock attempt images may be captured (either automatically or after user input) until a face is detected in a captured unlock attempt image. Examples of face detection processes are described in U.S. patent application Ser. No. 15/910,551 to Gernoth et al. and U.S. Provisional Patent Application No. 62/679,850 to Kumar et al., which are incorporated by reference as if fully set forth herein.

Additionally, in 404, an amount of occlusion in the images may be assessed. In certain embodiments, assessing an amount of occlusion in 404 includes generating occlusion maps and landmark maps (e.g., occlusion heat maps and landmark heat maps) for an image in which a face has been detected and using the generated maps to assess the amount of occlusion. For example, a landmark map may be used to identify locations of landmarks in an image and an occlusion map for the same image may be used to assess occlusion scores for the identified landmarks. An occlusion score may be, for example, a measurement or value that represents an estimation of how much the landmark is occluded (e.g., a value between 0 and 1 with 0 not being occluded and 1 being completely occluded). The amount of occlusion in the images may be assessed based on the occlusion scores for the images. For example, the amount of occlusion may be a composite (e.g., a summation or average) of the occlusion scores for the identified landmarks. Examples of assessing occlusion scores is described in U.S. patent application Ser. No. 15/934,559 to Gernoth et al., which is incorporated by reference as if fully set forth herein.

In certain embodiments, "process switch" 406 may be implemented after face detection and occlusion assessment in 404. Process switch 406 may include comparing the assessed amount of occlusion to occlusion threshold 408 to determine whether process 400 continues with full face facial recognition authentication process 450 or partial face facial recognition authentication process 450P. In certain embodiments, if the assessed amount of occlusion is below occlusion threshold 408 (e.g., the assessed occlusion scores (or a composite occlusion score) for the image are below a selected amount of occlusion set by the occlusion threshold), then process 400 continues with full face facial recognition authentication process 450 (shown in FIG. 16. Alternatively, if the assessed amount of occlusion is above occlusion threshold 408 (e.g., the assessed occlusion scores (or a composite occlusion score) for the image are above the selected amount of occlusion set by the occlusion threshold), then process 400 continues with partial face facial recognition authentication process 450P (shown in FIG. 17).

Figure 12:
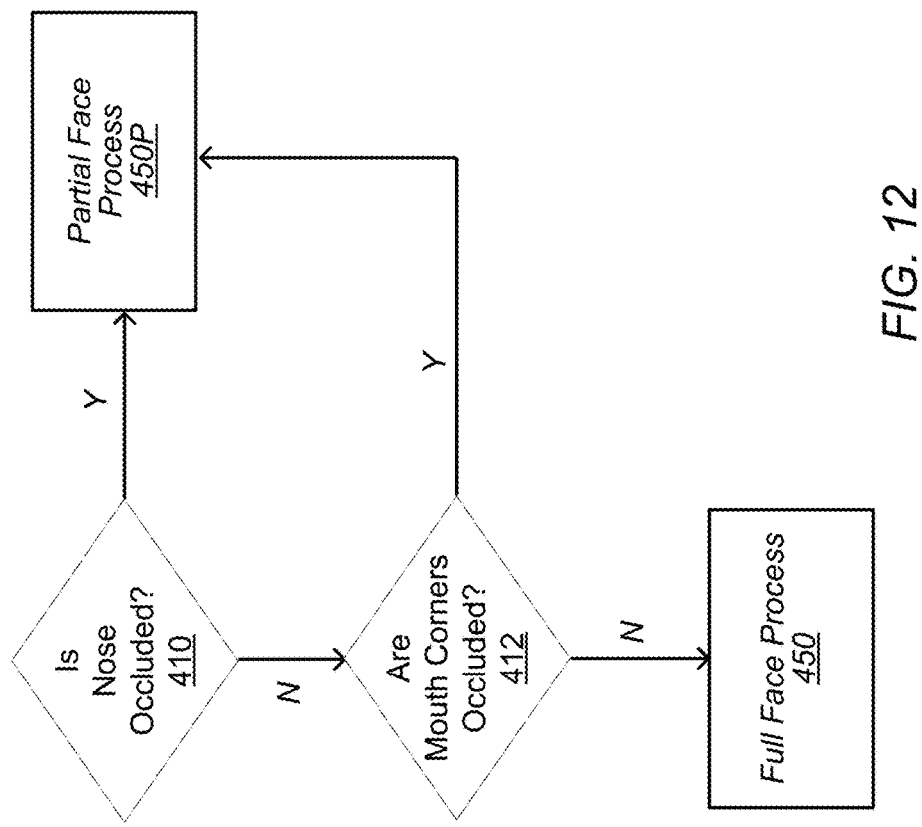
FIG. 12 depicts a flowchart of an embodiment of a rules-based method.

In some embodiments, process switch 406 compares the assessed amount of occlusion to occlusion threshold 408 using a rules-based method. The rules-based method may include, for example, rules about occlusion of landmarks in the image (e.g., the occlusion scores assessed for identified landmarks from the occlusion and landmark maps generated in 404). FIG. 12 depicts a flowchart of one embodiment of a possible rules-based method. In 410, occlusion of the nose (identified by its landmark) may be determined. If the nose is occluded ("Y") (e.g., the occlusion score for the nose is above the occlusion threshold), then process 400 may continue with partial face facial recognition authentication process 450P. If the nose is not occluded ("N") (e.g., the occlusion score for the nose is below the occlusion threshold), occlusion of the corners of the mouth may be determined in 412. In 412, if the mouth corners are occluded ("Y") (e.g., the occlusion scores for the corners of the mouth are above the occlusion threshold), then process 400 may continue with partial face facial recognition authentication process 450P. If the mouth corners are not occluded ("N") (e.g., the occlusion scores for the corners of the mouth are below the occlusion threshold), then process may continue with full face facial recognition authentication process 450. It is to be understood that when the nose is occluded, determination of occlusion of the mouth may not be needed as occlusion of the nose may be sufficient to send process 400 to partial face facial recognition authentication process 450P.

Figure 13:
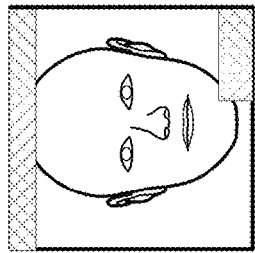
FIG. 13 depicts an example of an image of a user's face to be processed using a full face facial recognition authentication process based on a rules-based method.
Figure 14:
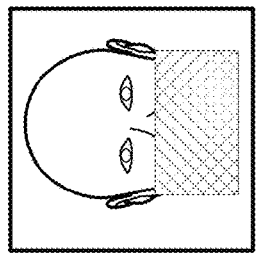
FIG. 14 depicts an example of an image of a user's face to be processed using a partial face facial recognition authentication process based on a rules-based method.
Figure 15:
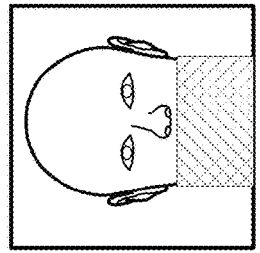
FIG. 15 depicts another example of an image of a user's face to be processed using a partial face facial recognition authentication process based on a rules-based method.

FIG. 13 depicts an example of an image of a user's face to be processed using full face facial recognition authentication process 450 based on the rules-based method depicted in FIG. 12. As shown in FIG. 13, neither the eyes nor the mouth are occluded. FIG. 14 depicts an example of an image of a user's face to be processed using partial face facial recognition authentication process 450P based on the rules-based method depicted in FIG. 12. As shown in FIG. 14, the nose is occluded (as well as the mouth). FIG. 15 depicts another example of an image of a user's face to be processed using partial face facial recognition authentication process 450P based on the rules-based method depicted in FIG. 12. As shown in FIG. 15, the nose is not occluded but the mouth is (e.g., both corners of the mouth).

In some embodiments, process switch 406 compares the assessed amount of occlusion to occlusion threshold 408 using a learning-based method. For embodiments of the learning-based method, process switch 406 may be a regressor trained on input images (e.g., training images) to assess an amount of occlusion above or below occlusion threshold 408. For example, the regressor may be trained to assess occlusion amounts of noses and/or mouths in the training images and provide a decision based on the assessed occlusion amounts to process the image using either the partial face or full face process. The regressor may be, for example, a linear-based regressor (such as a linear support vector machine) or a kernel-based regressor (such as a kernel support vector machine). In embodiments using the learning-based method, process switch 406 makes the decision for routing of process 400 based on the training of the process switch without comparison of occlusion amounts to specific rules.

For images captured in 402 that have high occlusion amounts (e.g., most of the face is occluded including some or all of the periocular region), the process used (e.g., either full face or partial) may not be important as there is a strong likelihood that the image will not be authenticated (e.g., matched to the authorized user) using either process because of the lack of features present in the image with high occlusion (e.g., not enough features in the image to provide a sufficient matching score for the image). Thus, process switch 406, whether using the rules-based method or the learning-based method for comparison to occlusion threshold 408, may provide an "either or" decision on continuing process 400 with full face facial recognition authentication process 450 or partial face facial recognition authentication process 450P. In some embodiments, if images captured in 402 have high occlusion amounts, process 400 may be ended (e.g., terminated) before proceeding with full face facial recognition authentication process 450 or partial face facial recognition authentication process 450P. Process 400 may be restarted with newly captured unlock attempt images in such embodiments.

FIG. 16 depicts a flowchart of an embodiment of full face facial recognition authentication process 450. After process switch 406 sends process 400 to process 450 (as shown in FIG. 11), the unlock attempt image captured in 402 is sent to "encode unlock attempt image 454". In 454, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 456 may be the output of the encoding of the unlock attempt image in 454.

In certain embodiments, in 458, feature vector(s) 456 are compared to feature vectors in the full face templates (e.g., static templates 316 and/or dynamic templates 326) of template space 320 to get matching score 460 for the unlock attempt image. In certain embodiments, template space 320 is the template space for an enrollment profile on device 100. Matching score 460 may be a score of the differences between feature vector(s) 456 and feature vectors in template space 320 (e.g., feature vectors in static templates 316 and/or other dynamic templates 326 added to the template space as described herein). The closer (e.g., the less distance or less differences) that feature vector(s) 456 and the feature vectors in template space 320 are, the higher matching score 460 may be. For example, as shown in FIG. 9, feature vector 456A (open diamond) is closer to feature vectors 310 than feature vector 456B (open diamond) (e.g., feature vector 456B is a further outlier than feature vector 456A). Thus, feature vector 456A would have a higher matching score than feature vector 456B. As feature vector 456B is further away from feature vectors 310 than feature vector 456A, the lower matching score for feature vector 456B means less confidence that the face in the unlock attempt image associated with feature vector 456B is the face of the authorized user associated with the enrollment profile and template space 320.

In some embodiments, comparing feature vector(s) 456 and templates from template space 320 to get matching score 460 includes using one or more classifiers or a classification-enabled network to classify and evaluate the differences between feature vector(s) 456 and templates from template space 320. Examples of different classifiers that may be used include, but are not limited to, linear, piecewise linear, nonlinear classifiers, support vector machines, and neural network classifiers. In some embodiments, matching score 460 is assessed using distance scores between feature vector(s) 456 and templates from template space 320.

In 462, matching score 460 is compared to unlock threshold 464 for device 100. Unlock threshold 464 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 464 may be a threshold value that determines whether the unlock feature vectors (e.g., feature vectors 456) are similar enough (e.g., close enough) to the templates associated with the authorized user's face (e.g., static templates 316 in template space 320). As further example, unlock threshold 464 may be represented by circle 465 in feature space 312, depicted in FIG. 9. As shown in FIG. 9, feature vector 456A is inside circle 465 and thus feature vector 456A would have matching score 460 above unlock threshold 464. Feature vector 456B, however, is outside circle 465 and thus feature vector 456B would have matching score 460 below unlock threshold 464. In certain embodiments, unlock threshold 464 is set during manufacturing and/or by the firmware of device 100. In some embodiments, unlock threshold 464 is updated (e.g., adjusted) by device 100 during operation of the device.

As shown in FIG. 16, in 462, if matching score 460 is above unlock threshold 464 (i.e., the user's face in the unlock attempt image substantially matches the face of the authorized user), the user in the unlock attempt image is authenticated as the authorized user for the enrollment profile on device 100 and the device is unlocked in 466. In 462, if matching score 460 is below unlock threshold 464 (e.g., not equal to or above the unlock threshold), then device 100 is not unlocked in 468 (e.g., the device remains locked). It should be noted that device 100 may be either locked or unlocked if matching score 460 is equal to unlock threshold 464 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 470. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 402) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 472. In some embodiments, when the device is locked in 472, an error message may be displayed (e.g., on display 108) indicating that facial recognition authentication process 450 has failed and/or the desired operation of device 100 is restricted or prevented from being performed. Device 100 may be locked from further attempts to use facial authentication in 472 for a specified period of time and/or until another authentication protocol is used to unlock the device. For example, unlock options 474 may be used to unlock device 100.

Unlock options 474 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 474 may include, but not be limited to, using a passcode, a password, pattern entry, a different form of biometric authentication, or another authentication protocol to unlock device 100. In some embodiments, unlock options 474 includes providing a "use passcode/password/pattern" affordance that, when selected causes display of a passcode/ password/pattern entry user interface, or a passcode/password/pattern entry user interface, or a "use fingerprint" prompt that, when displayed, prompts the user to place a finger on a fingerprint sensor for the device.

If the unlock attempts are below the threshold in 470 (e.g., number of unlock attempts are below the maximum number of attempts allowed), then process 400, shown in FIG. 11, may be run again (re-initiated) beginning with capturing another unlock attempt image in 402 (e.g., process 400 is re-initiated and a new image of the user is captured (such as a new flood IR image) in 402). In some embodiments, when process 400 is re-initiated, the process may bypass process switch 406 and automatically process the new unlock attempt image using process 450. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 400 is being re-initiated. In some embodiments, device 100 may prompt the user to provide input to re-initiate process 400. For example, the user may be prompted to acknowledge or otherwise confirm (either visually and/or audibly) the attempt to re-initiate process 400.

FIG. 17 depicts a flowchart of an embodiment of partial face facial recognition authentication process 450P. After process switch 406 sends process 400 to process 450P (as shown in FIG. 11), the unlock attempt image captured in 402 may be cropped and resized in 452P. Cropping and resizing of the images may be accomplished using a process similar to process 230, described in FIG. 7. In certain embodiments, the images are cropped to include the periocular portion of the user's face in the images. The images may, however, be cropped to include other portions of the user's face, as described herein. In 452P, the images may also be aligned (e.g., using landmarks for the eyes) and rotated to place the images in a normal (e.g., portrait) alignment.

After cropping and resizing of the image in 452P, the image may be encoded in 454P to define the facial features of the user as one or more feature vectors in the feature space. Unlock feature vector(s) 456P may be the output of the encoding of the unlock attempt image in 454P. In certain embodiments, in 458P, feature vector(s) 456P are compared to feature vectors for the partial face templates (e.g., static templates 316P and/or dynamic templates 326P) of template space 320 to get matching score 460P for the unlock attempt image. Matching score 460P may be a matching score for the partial face templates that operates similar to matching score 460 for full face templates, shown in FIG. 16.

As shown in FIG. 17, matching score 460P may be compared to unlock threshold 464P for device 100 in 462P. In certain embodiments, unlock threshold 464P is substantially similar to unlock threshold 464, shown in FIG. 16. In some embodiments, unlock threshold 464P has stricter requirements than unlock threshold 464. Providing unlock threshold 464P with stricter (e.g., higher) requirements may increase the security requirements for matching in process 450P (e.g., lower the false acceptance rate). In some embodiments, unlock threshold 464P is set to provide security requirements for process 450P that are substantially similar to the security requirements for process 450. In some embodiments, unlock threshold 464P is updated (e.g., adjusted) by device 100 during operation of the device.

As shown in FIG. 17, if matching score 460P is above unlock threshold 464P (i.e., the portion of the user's face in the unlock attempt image substantially matches the portion of the face of the authorized user), the user in the unlock attempt image is authenticated as the authorized user for the enrollment profile on device 100 and the device is unlocked in 466P. In 462P, if matching score 460P is below unlock threshold 464P (e.g., not equal to or above the unlock threshold), then device 100 is not unlocked in 468P (e.g., the device remains locked).

In certain embodiments, the unlock attempts are compared to a threshold in 470. As described above, the threshold may be, for example, a maximum number of unlock attempts allowed or a maximum allotted time for unlock attempts. In some embodiments, the number of unlock attempts is a combination of unlock attempts using process 450P and process 450 (e.g., total attempts for process 400). In some embodiments, a number of unlock attempts is counted separately for process 450P from process 450 (e.g., the number of attempts to unlock device 100 with each process is counted separately).

If the unlock attempts reaches the threshold (e.g., number of unlock attempts reaches the maximum number of attempts allowed), then device 100 (as with process 400) may be locked from further attempts to use facial authentication in 472. In some embodiments, unlock options 474 are used to unlock device 100 after the device is locked in 472. If the unlock attempts are below the threshold in 470 (e.g., number of unlock attempts are below the maximum number of attempts allowed), then process 400, shown in FIG. 11, may be run again (re-initiated) beginning with capturing another unlock attempt image in 402, as described above.

As described herein, the decisions in process 450 and process 450P are independently operated decisions in process 400 that arrive at an authentication decision (e.g., either unlock device or do not unlock device) using either full face authentication or partial face authentication of the user in the unlock attempt image. Operating process 450 and process 450P as optional sub-processes of process 400 (e.g., either process 450 is operated or process 450P is operated on an unlock attempt image) may reduce processing requirements for device 100. For example, only one operation is run instead of doubling operations by running both processes.

Process 450P, as described herein, may be used in situations where there is at least some occlusion in the unlock attempt image. Using process 450P (for some occlusion cases) as an option in addition to process 450 (for full faces) provides increased usability of process 400. For example, process 400 may be capable of authenticating the user even with some occluded features in the faces (e.g., faces with occlusion but periocular portions visible) by using process 450P when process 400 is likely to fail in authenticating the user due to the occlusion. Processing of partial face images (e.g., in training process 200 and process 450P) may, however, be subjected to tighter (stronger) restrictions than processing of full face images. Placing stronger restrictions on processing of partial face images may increase the security of the processing to maintain the security level on a level with processing using full face images while increasing usability of the device.

In certain embodiments, one or more process steps described herein may be performed by one or more processors (e.g., a computer processor) executing instructions stored on a non-transitory computer-readable medium. For example, process 200, process 230, process 300, process 400, process 450, and process 450P, shown in FIGS. 4, 7, 8, 11, 16, and 17 may have one or more steps performed by one or more processors executing instructions stored as program instructions in a computer readable storage medium (e.g., a non-transitory computer readable storage medium).

Figure 18:
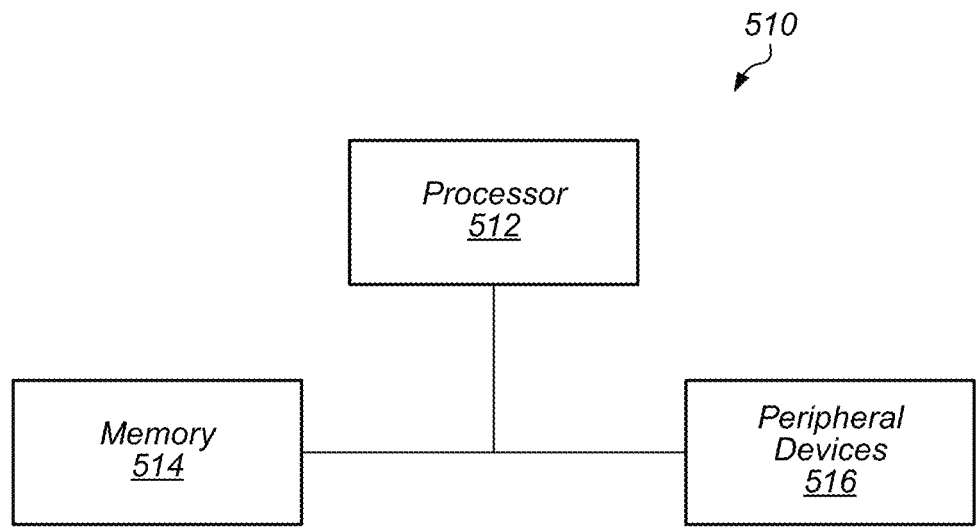
FIG. 18 depicts a block diagram of one embodiment of an exemplary computer system.

FIG. 18 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 230, process 300, process 400, process 450, and process 450P, shown in FIGS. 4, 7, 8, 11, 16, and 17. In the embodiment of FIG. 18, computer system 510 includes processor 512, memory 514, and various peripheral devices 516. Processor 512 is coupled to memory 514 and peripheral devices 516. Processor 512 is configured to execute instructions, including the instructions for process 200, process 230, process 300, process 400, process 450, and/or process 450P, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 19:
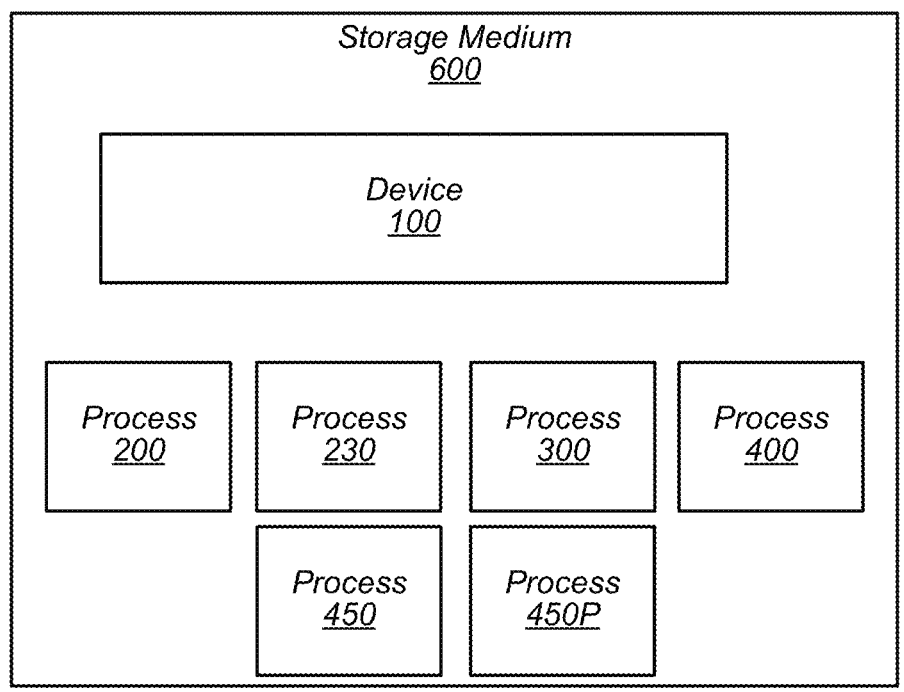
FIG. 19 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 19, other input/output (I/O) devices such as video hardware, audio hardware, user interface devices, networking hardware, etc.).

Turning now to FIG. 19, a block diagram of one embodiment of computer accessible storage medium 600 including one or more data structures representative of device 100 (depicted in FIG. 1) included in an integrated circuit design and one or more code sequences representative of process 200, process 230, process 300, process 400, process 450, and/or process 450P (shown in FIGS. 4, 7, 8, 11, 16, and 17). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
obtaining at least one first image of a user using a camera located on a device while the user is illuminated with flood infrared illumination by a first illuminator located on the device, the device comprising a computer processor and a memory;
obtaining at least one second image of the user using the camera while the user is illuminated with patterned infrared illumination by a second illuminator located on the device;
assessing an amount of occlusion of a face of the user in the at least one first image;
operating a full face authentication process on the at least one first image and the at least one second image to determine that the user is an authorized user of the device in response to the assessed amount of occlusion of the face in the at least one first image being determined to be equal to or below an occlusion threshold;
operating a partial face authentication process on the at least one first image and the at least one second image to determine that the user is the authorized user of the device in response to the assessed amount of occlusion of the face in the at least one first image being determined to be above the occlusion threshold; and
authorizing the user to perform at least one operation on the device that requires authentication in response to determining that the user is the authorized user of the device.

2. The method of claim 1, wherein assessing the amount of occlusion of the face comprises assessing one or more occlusion scores from an occlusion map generated for the face in the at least one first image.

3. The method of claim 1, wherein assessing the amount of occlusion of the face comprises operating a regressor on the face in the at least one first image.

4. The method of claim 3, wherein the regressor comprises a regressor trained to assess occlusion amounts of features in a plurality of training images and to provide a decision based on the assessed occlusion amounts.

5. The method of claim 1, wherein assessing the amount of occlusion of the face comprises assessing an amount of occlusion of a nose and a mouth on the face in the at least one first image.

6. The method of claim 1, further comprising determining a position of one or more landmarks in the at least one first image, and aligning the at least one first image based on the position of the landmarks.

7. The method of claim 1, further comprising cropping the at least one first image and the at least one second image for the partial face authentication process, wherein the cropped portions of the at least one first image and the at least one second image include periocular regions of the face.

8. The method of claim 1, further comprising:
assessing the at least one first image to determine whether a face is present in the at least one first image;
in response to determining the face is present in the at least one first image, generating a landmark map for the at least one first image, the landmark map identifying a location of landmarks on the face of the user, wherein the landmarks include a nose, a mouth, and eyes of the user;
generating an occlusion map for the at least one first image, the occlusion map including values of occlusion for the at least one first image; and
wherein assessing the amount of occlusion of the face of the user in the at least one first image includes assessing occlusion scores for the nose and the mouth on the face of the user in the at least one first image based on locations of the nose and the mouth on the landmark map and the values of occlusion on the occlusion map.

9. The method of claim 8, further comprising operating the full face authentication process on the at least one first image and the at least one second image to determine that the user is the authorized user of the device in response to the assessed occlusion scores of the nose and mouth in the at least one first image being determined to be equal to or below the occlusion threshold.

10. The method of claim 8, further comprising operating the partial face authentication process on the at least one first image and the at least one second image to determine that the user is the authorized user of the device in response to the assessed occlusion scores of the nose and mouth in the at least one first image being determined to be above the occlusion threshold, wherein the partial face authentication process includes:
cropping, based on the location of the eyes in the landmark map, the at least one first image to form a cropped portion that includes a periocular region of the face in the at least one first image; and
comparing the cropped portion of the at least one first image to one or more partial face templates to determine whether the user is the authorized user of the device, wherein the partial face templates are generated from portions of enrollment images of the authorized user on the device cropped to include the periocular region of the face in the enrollment images.

11. The method of claim 8, wherein assessing the occlusion scores for the nose and the mouth on the face of the user in the at least one first image comprises assessing the occlusion score for the nose against a first occlusion threshold and the occlusion score for the mouth against a second occlusion threshold, and wherein the partial face authentication process is operated in response to either the occlusion score for the nose being above first occlusion threshold or the occlusion score for the mouth being above the second occlusion threshold.

12. A device, comprising:
a computer processor;
a memory;
a camera;
at least one illuminator configured to provide infrared illumination;
circuitry coupled to the camera and the illuminator, wherein the circuitry is configured to:
obtain at least one image of a user using the camera while the user is illuminated with infrared illumination by the at least one illuminator;
assess the at least one image to determine whether a face is present in the at least one image;
assess occlusion scores for a nose and a mouth on the face of the user in the at least one image;
operate a full face authentication process on the at least one image to determine that the user is an authorized user of the device in response to the assessed occlusion scores of the nose and mouth in the at least one image being determined to be equal to or below an occlusion threshold;
operate a partial face authentication process on the at least one image to determine that the user is the authorized user of the device in response to the assessed occlusion scores of the nose and mouth in the at least one image being determined to be above the occlusion threshold; and
authorize the user to perform at least one operation on the device that requires authentication in response to determining that the user is the authorized user of the device.

13. The device of claim 12, wherein the circuitry is further configured to:
in response to determining the face is present in the at least one image, generate a landmark map for the at least one image, the landmark map identifying a location of landmarks on the face of the user, wherein the landmarks include the nose, the mouth, and eyes of the user; and
assess the occlusion scores for the nose and the mouth on the face of the user in the at least one image based on locations of the nose and the mouth on the landmark map and the values of occlusion on the occlusion map.

14. The device of claim 12, wherein the partial face authentication process includes:
cropping, based on the location of the eyes in the landmark map, the at least one image to form a cropped portion that includes a periocular region of the face in the at least one image; and
comparing the cropped portion of the at least one image to one or more partial face templates to determine whether the user is the authorized user of the device, wherein the partial face templates are generated from portions of enrollment images of the authorized user on the device cropped to include the periocular region of the face in the enrollment images.

15. The device of claim 12, wherein the at least one illuminator comprises a first illuminator and a second illuminator, and wherein the first illuminator is configured to provide flood infrared illumination and the second illuminator is configured to provide patterned infrared illumination.

16. The device of claim 15, wherein the circuitry is configured to obtain the at least one image when the user is illuminated with flood infrared illumination by the first illuminator located on the device.

17. The device of claim 12, wherein the circuitry is configured to obtain the at least one image when the user is illuminated with flood infrared illumination by the first illuminator located on the device.

18. A non-transitory computer-readable medium having instructions stored thereon that are executable by a computing device to perform operations, comprising:
   obtaining at least one first image of a user using a camera located on a device while the user is illuminated with flood infrared illumination by a first illuminator located on the device, the device comprising a computer processor and a memory;
   obtaining at least one second image of the user using the camera while the user is illuminated with patterned infrared illumination by a second illuminator located on the device;
   assessing an amount of occlusion of a face of the user in the at least one first image;
   operating a full face authentication process on the at least one first image and the at least one second image to determine that the user is an authorized user of the device in response to the assessed amount of occlusion of the face in the at least one first image being determined to be equal to or below an occlusion threshold;
   operating a partial face authentication process on the at least one first image and the at least one second image to determine that the user is the authorized user of the device in response to the assessed amount of occlusion of the face in the at least one first image being determined to be above the occlusion threshold; and
   authorizing the user to perform at least one operation on the device that requires authentication in response to determining that the user is the authorized user of the device.

19. The non-transitory computer-readable medium of claim 18, wherein operating the partial face authentication process includes:
   cropping the at least one first image to form a cropped portion that includes a periocular region of the face in the at least one first image; and
   comparing the cropped portion of the at least one first image to one or more partial face templates to determine whether the user is the authorized user of the device, wherein the partial face templates are generated from portions of enrollment images of the authorized user on the device cropped to include the periocular region of the face in the enrollment images.

20. The non-transitory computer-readable medium of claim 18, wherein assessing the occlusion scores for the nose and the mouth on the face of the user in the at least one first image comprises assessing the occlusion score for the nose against a first occlusion threshold and the occlusion score for the mouth against a second occlusion threshold, and wherein the partial face authentication process is operated in response to either the occlusion score for the nose being above first occlusion threshold or the occlusion score for the mouth being above the second occlusion threshold.

* * * * *